United States Patent
Meyer et al.

(10) Patent No.: US 6,507,454 B1
(45) Date of Patent: Jan. 14, 2003

(54) CURVED TRIM PROFILE FOR ABS TRIMMED INDUCTIVE HEADS

(75) Inventors: Dallas W. Meyer, Burnsville, MN (US); Steven B. Slade, New Hope, MN (US); Jeffery K. Berkowitz, Carver, MN (US); Edward M. Simpson, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 547 days.

(21) Appl. No.: 09/050,477

(22) Filed: Mar. 30, 1998

Related U.S. Application Data
(60) Provisional application No. 60/061,259, filed on Oct. 3, 1997.

(51) Int. Cl.$^7$ .............................................. G11B 5/187
(52) U.S. Cl. ...................................................... 360/122
(58) Field of Search ................................ 360/122, 125, 360/126, 113

(56) References Cited

U.S. PATENT DOCUMENTS

| | | | |
|---|---|---|---|
| 4,984,118 A | * 1/1991 | Springer | 360/125 |
| 5,057,956 A | * 10/1991 | Muratomi et al. | 360/122 |
| 5,402,295 A | * 3/1995 | Suzuki et al. | 360/126 |
| 5,615,069 A | * 3/1997 | Slade et al. | 360/126 |
| 5,675,461 A | * 10/1997 | Aylwin et al. | 3560/126 |
| 5,726,841 A | * 3/1998 | Tong et al. | 360/122 |
| 5,850,326 A | * 12/1998 | Takano et al. | 360/122 |

FOREIGN PATENT DOCUMENTS

JP    3-78105    * 4/1991

* cited by examiner

*Primary Examiner*—Jefferson Evans
(74) *Attorney, Agent, or Firm*—Kinney & Lange, P.A.

(57) ABSTRACT

A slider includes a magnetic head having first and second magnetic poles separated by a gap. A recess in the air-bearing surface extends into at least the first magnetic pole and has a first portion having a length parallel to the gap length to define a gap width orthogonal to the gap length. The first portion of the recess has a curved depth defining a curved profile along its length. In one embodiment, the recess has a second portion having a length orthogonal to the gap length and a depth defining a curved profile along its length.

20 Claims, 3 Drawing Sheets

CURVED TRIM PROFILE FOR ABS TRIMMED INDUCTIVE HEADS

CROSS-REFERENCE TO RELATED APPLICATION

This application claims priority from U.S. Provisional Application No. 60/061,259 filed Oct. 3, 1997 for "Optimum Trim Profiles for ABS Trimmed Recording Heads Using a Focused Ion Beam" by Dallas W. Meyer, Steven B. Slade, Jeffery K. Berkowitz and Edward M. Simpson.

BACKGROUND OF THE INVENTION

This invention relates to recording heads, and particularly to inductive heads having magnetic poles separated by a trimmed gap.

In the magnetic disc recording art, sliders are used to "fly" transducing heads at a design distance from the recording media. The slider usually includes rails having air-bearing surfaces to react against an air cushion formed by the rotating adjacent magnetic disc. The transducing head is typically fabricated into the slider and exposed to the trailing edge of a rail at the air-bearing surface. Cavities and other aerodynamic features on the slider cooperate to cause the head to be positioned the design distance from the rotating media.

The "width" of a magnetic head is defined by the radial width of the transducer, in relation to the adjacent track on the media. The "length" of the transducer is defined as the distance between the opposing ends of the sensor along the length of the adjacent track; the length being orthogonal to the width. In an inductive head, such as a write head or inductive read head, the width and length of the head is determined by the width and length of the transducing gap. Both the gap length and gap width are defined on the air-bearing surface of the slider. Control of the gap width is important, particularly in write heads where the gap width defines the width of the track being written. In read heads, the gap width is also important, since the width of the gap in a read head should be less than the width of the recorded track to minimize the risk of reading data from adjacent tracks simultaneously. However, the gap width of a read head should also be as wide as possible, within the bounds of the track, to maximizing recovered signal strength. Likewise, the length of a gap is important, since gap length affects recording density and strength.

Typically, the width of the gap in an inductive head is defined by recesses on each side of the intended gap. The recesses extend across the gap material and into the poles at each end (along the length) of the gap. Typically the recesses are etched into the air-bearing surface by ion etching with a focused ion beam. The focused ion beam removes a small amount of material approximately 0.2 microns in diameter. The beam is rastered back and forth across the region being etched to form recesses in the air-bearing surface. The recesses are in the form of rectangular troughs having very sharp features, including sharp internal corners and square edges. The recesses, being adjacent the gap, minimize magnetic flux outside the edges of the gap width, thereby minimizing the writing data outside the track on the disc (in the case of a write head). In the case of a read head, the recesses minimize the ability of the head to pick up stray flux from adjacent tracks. Thus, the recesses define the gap width.

One problem with present techniques of forming recesses adjacent the gap concerns the rastering of the ion beam. Ion milling requires highly precise machines and a considerable amount of time. The amount of time required by the ion milling process is directly related to the amount of material removed by the ion milling beam. The cost of manufacturing the recording head is directly related to the amount of time required to mill the recesses, and hence the amount of material milled. It is estimated that if the amount of material milled could be reduced by one-third, the cost per slider could be reduced by approximately $0.02. A facility manufacturing one million sliders per day could save up to $20,000.00 per day.

Accordingly, there is a need for a more efficient technique for forming the recesses defining the gap width of an inductive head.

BRIEF SUMMARY OF THE INVENTION

A slider according to the present invention includes an inductive magnetic head having first and second magnetic poles separated by a gap. The first and second poles and gap are supported on the slider with the gap having a gap length extending between the poles. A recess in the air bearing surface extends into at least the first magnetic pole and has a first portion having a length parallel to the gap length to define a gap width orthogonal to the gap length. The first portion of the recess has a curved depth defining a curved profile along its length.

In one embodiment, the magnetic head is a write head having a coil for carrying a write current so that the first and second poles and coil generate a write magnetic field having a write field strength in the confronting magnetic media, the write field strength being greater than a minimum media switching strength. The curved profile of the recess is arranged to shape the magnetic field strength in the magnetic media confronting the recess to a relatively flat profile along the length of the recess that is smaller than the minimum media switching strength.

In another embodiment, the recess has a second portion extending into the air bearing surface. The second portion of the recess has a length orthogonal to the gap length and a depth defining a curved profile along its length and intersecting the air bearing surface remote from the gap.

One aspect of the present invention resides in a process of forming recesses in the slider to define the gap width. More particularly, a slider is provided having a planar air bearing surface and first and second magnetic poles separated by a gap in the plane of the air bearing surface. The gap has a gap length extending between the poles. A first portion of a recess is etched into the air bearing surface adjacent the gap along a length parallel to the gap length and extending into at least the first magnetic pole. The first portion defines a gap width orthogonal to the gap length. The etching of the first portion forms a curved depth defining a curved profile along the length of the first portion.

In one embodiment of the process, the magnetic head is a write head having a coil for carrying a write current so that the first and second poles and coil generate a write magnetic field having a write field strength in the confronting magnetic media, the write field strength being greater than a minimum media switching strength. The etching of the curved profile of the recess is arranged to shape the magnetic field strength in the magnetic media confronting the recess to a relatively flat profile along the length of the recess that is smaller than the minimum media switching strength.

In another embodiment, the process includes etching a second portion of the recess into the air bearing surface along a length orthogonal to the gap length, the etching of the second portion forming a curved depth defining a curved profile along the length and width of the second portion.

DETAILED DESCRIPTION

The present invention relates to a recess defining the gap width of a magnetic head, in which the recess has a non, uniform depth to reduce the cost of milling and the profile of the non-uniform depth is designed to maintain adequate gap definition. More particularly, the magnetic flux of a fixed gap write head decreases with increasing distance from the gap. More particularly, the magnetic field formed under a head along the track (along and beyond the gap length) during recording is expressed by the equation $$H_x = \frac{H_g}{\pi} \left[ \arctan\frac{g/2+x}{y} + \arctan\frac{g/2-x}{y} \right]$$

where $H_g$ is the field in the gap, g is the gap length or spacing, x is the distance from the center of the gap, and y is the head/media spacing. The present invention is directed at a recess defining the width of the gap, in which the recess has a profile that takes advantage of the decreasing flux along the length of the head (track) from the gap. More particularly, if the bottom of the recess slopes upwardly toward the air-bearing surface as the distance of the recess increases longitudinally from the gap, the trench may be formed more economically without significantly affecting the performance of the head.

Figure 1A:
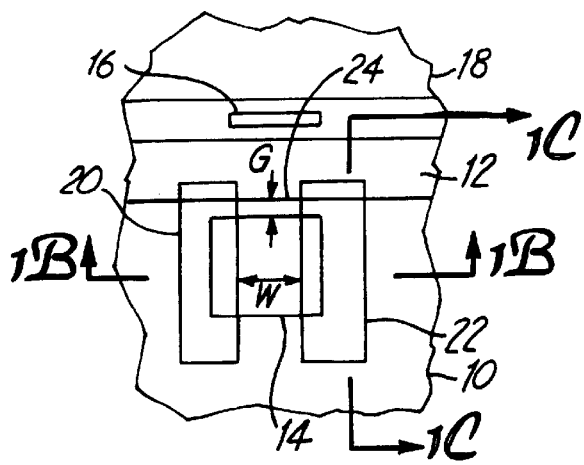
FIG. 1A is a plan view of an air-bearing surface of a portion of a prior art slider containing a magnetic head.
Figure 1B:
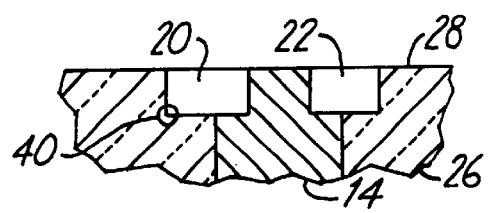
FIGS. 1B and 1C are section views taken at lines 1B—1B and 1C—1C in FIG. 1A, respectively.
Figure 1C:
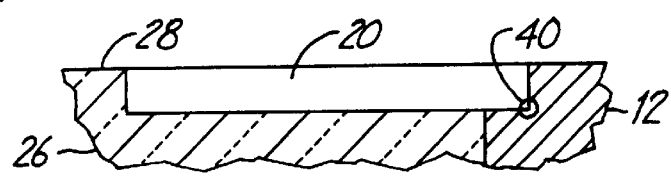
Figure 1D:
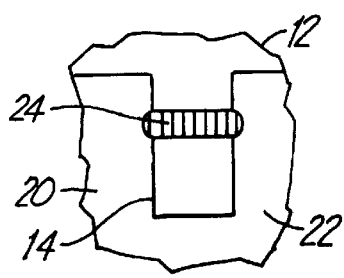
FIG. 1D is a diagram illustrating magnetic flux across the gap of the head illustrated in FIG. 1A.

FIGS. 1A–1C illustrate a typical prior art inductive head. As shown in FIG. 1A, the head is formed on a slider 10 and includes first and second permanent magnetic poles 12 and 14 formed of suitable permanent magnetic material, such as Permalloy. Conveniently, pole 12 may be a shared pole acting as a shield for a magneto resistive read head 16 having a second shield 18. The portion of pole 14 shown in FIG. 1C might, for example, be the throat portion of a magnetic layer, whose paddle section (not shown) is further receded into the figure. Recesses 20 and 22 are formed on opposite sides of gap 24 formed between poles 12 and 14. Conveniently, defined by dimension 6, is formed of an insulating material 26 (FIG. 1C), which might surround pole 14 and encapsulate conductive coils (not shown) associated with the inductive head.

Figure 2:
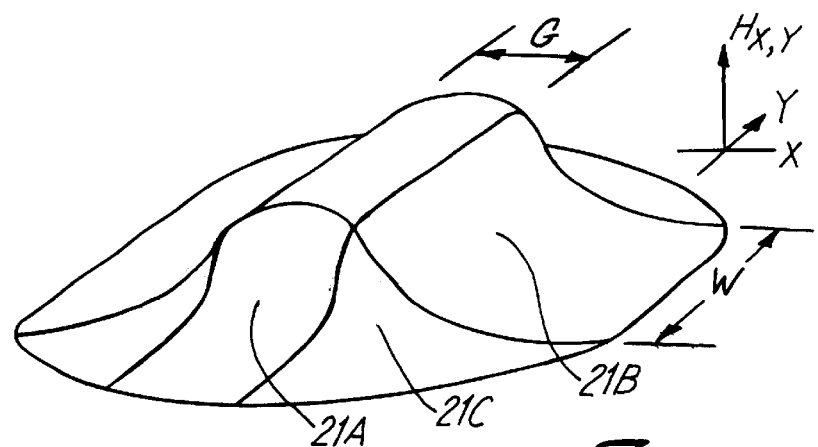
FIG. 2 is a three-dimensional view of the field strength across the gap of the head illustrated in FIG. 1A.
Figure 3A:
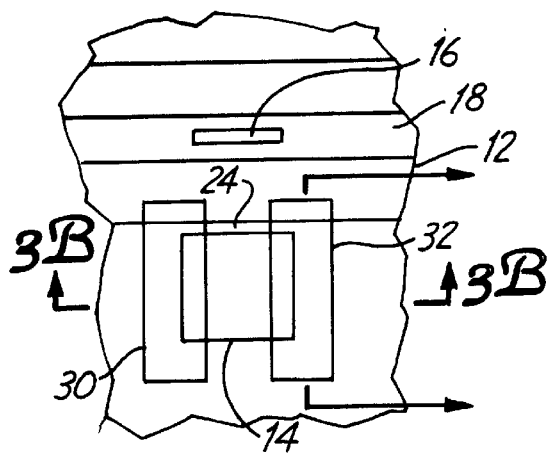
FIG. 3A is a plan view of the air-bearing surface of a portion of a slider containing a magnetic head in accordance with a first embodiment of the present invention.
Figure 3B:
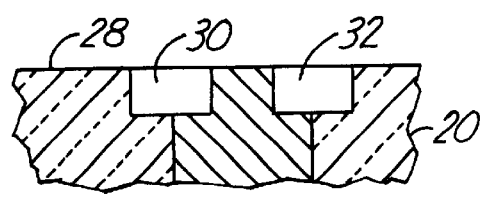
FIGS. 3B and 3C are section views taken at lines 3B—3B and 3C—3C in FIG. 3A, respectively.
Figure 3C:
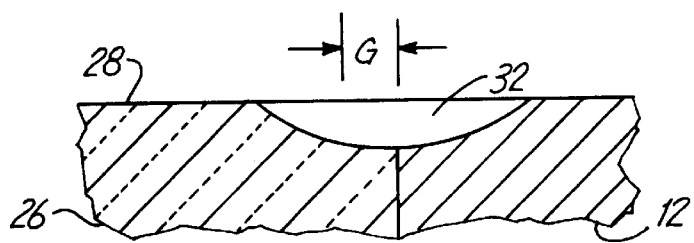
Figure 3D:
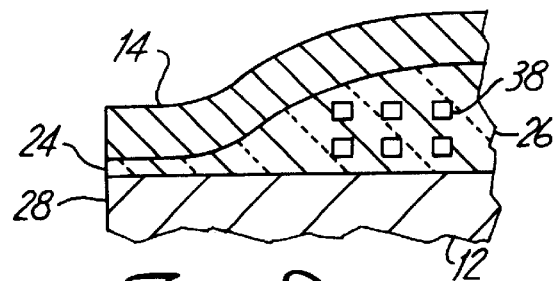
FIG. 3D is a section view of the head illustrated in FIGS. 3A–C, illustrating the relationship of the poles, gap and coil.

Recesses 20 and 22 are formed by rastering a focused ion milling beam across air-bearing surface 28 to define the recesses 20 and 22 having well-defined rectangular shapes. For example, the etching of recesses 20 and 22 typically was to a depth of about 1 micron with a width parallel to the gap width of approximately 2 microns, defined by dimension w. Also typically, recesses 20 and 22 extended across the gap material and into the common pole 12, thereby fully encompassing the gap region. In a write mode as shown in FIG. 2, flux lines generated by the write coil were concentrated to the region between the poles 12 and 14, with little flux radially outside the gap defined by recesses 20 and 22. Hence, the flux sharply reduced in region 21A confronting the recesses radially adjacent the gap (co-linear to and outside the width of the gap) due to recesses 20 and 22. Moreover, as demonstrated by the above equation, the flux also sharply reduced in region 21B longitudinally in front of and behind the gap (along the length of the track). In regions 21C, which confront recesses 20 and 22 and longitudinally forward and behind the gap, the effects of both the above equation and the recesses cause an even greater reduction of flux. In the case of a write head, the generated field strength in regions 21A, 21B and 21C is smaller than the minimum field strength necessary for media switching of the adjacent magnetic disc. In a read head, flux for the recording media is concentrated into the gap by the poles and recesses to maximize the recovered signal strengths. Consequently, the prior art head exhibited good concentrated field patterns for recording and reading data to and from the confronting recording media.

The present invention is illustrated in FIGS. 3A–D and employs recesses 30 and 32 having curved or parabolic profiles along their lengths. As shown particularly in FIG. 3C, the shape of recesses 30, 32 is preferably a continuous curve, having its greatest depth in the region adjacent the gap. By employing a second-order parabolic shape to recesses 30 and 32, milling time is reduced by about one-third, for a rectangular-shaped trench. Consequently, production costs of the slider are reduced. Moreover, the performance of the head is not materially affected by the curved profiles to the recesses.

Figure 4:
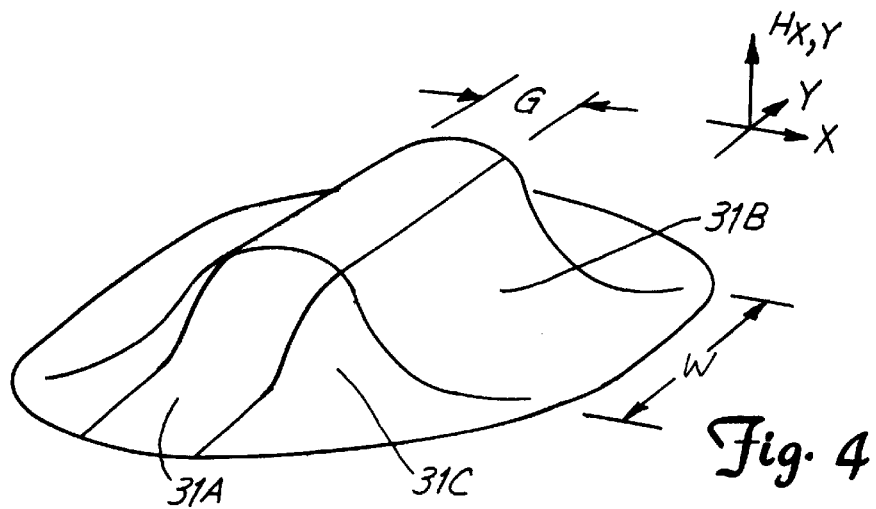
FIG. 4 is a three-dimensional view of the field strength across the gap of the head illustrated in FIGS. 3A–D.

FIG. 4 illustrates the field strength of a write head employing a recess in accordance with the present invention. As shown at 31A and 31B, the field strength radially adjacent the gap (at 31A) and longitudinally in front of and behind the gap (at 31B) closely follow the field strength profiles prior art head illustrated at 21A and 21B in FIG. 2. However, at regions 31C confronting recesses 30 and 32 longitudinally forward and behind the gap, the smaller depth to the recesses due to the curved profiles increases the field strength to an amount greater than in the corresponding regions 21C shown in FIG. 2. Nevertheless, the effects of the above equation on the field strength in the longitudinal direction maintains the field strength to below the switching level of the media. More particularly, write current in coil 38 (FIG. 3D) generates a write magnetic field having a write field strength. In the magnetic media confronting the gap, the write field strength is greater than the minimum media switching strength of the media. The curved profile of recesses 30 and 32 shape the magnetic field strength in the magnetic media confronting the recess to a relatively flat profile along the length of the recess that is smaller than the minimum media switching strength. Thus, the curved profile along the length of recesses 30 and 32 permits the field strength in the region outside the track and forward and behind the gap to follow a less sharp profile, shown at 31C in FIG. 4, rather than the sharp profile at 21C in FIG. 2.

Where the head is a read head, flux from the recording media is concentrated into the gap by the poles and recesses to induce a current into coil 38, thereby maximizing recovered signal strengths.

One feature of the curved recesses 30 and 32 resides in the fact that the curved shape of the troughs is less likely to collect debris, grease, or lubricant, as in more sharply defined recesses of the prior art. Consequently, less debris is collected with a head having the curved recess, resulting in less likelihood of smearing the head, leading to possible head malfunctions. Another feature of the invention resides in the absence of flux constriction due to sharp internal corners in the recesses. As shown in FIGS. 1B and 1C, the sharp corners 40 in the prior art recesses 20, 22 generated flux constrictions, causing abnormalities in the field strength pattern. The curved recesses of the present invention eliminates the sharp corners in the recesses, resulting in reduced flux constriction over heads of the prior art.

Figure 5A:
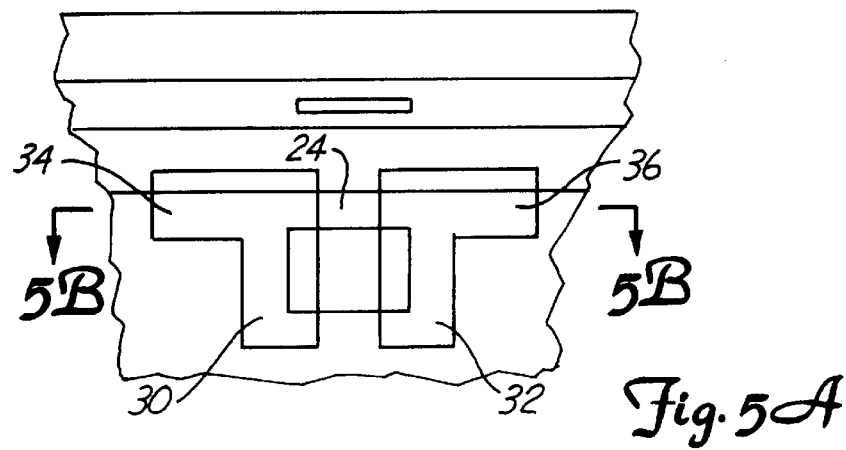
FIG. 5A is a plan view of the air-bearing surface of a portion of a slider containing a magnetic head in accordance with a second embodiment of the present invention.
Figure 5B:
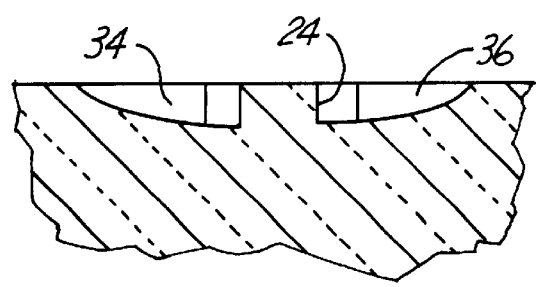
FIG. 5B is a section view taken at line 5B—5B in FIG. 5A.

FIGS. 5A and 5B illustrate a modification of the present invention in which L-shaped recesses are employed having a first leg 30, 32 as in FIGS. 3A–3D, and a second leg 34, 36 orthogonal to the first legs 30, 32, respectively. Legs 34, 36 have depths that are parabolically curved away from the gap 24. Legs 34 and 36 extend the recesses radially from the width of the gap to further ensure a sharp profile at region 31B of the field strength profile illustrated in FIG. 4.

Although the present invention has been described with reference to preferred embodiments, workers skilled in the art will recognize that changes may be made in form and detail without departing from the spirit and scope of the invention.

What is claimed is:

1. An inductive magnetic head having
   first and second magnetic poles separated by a gap, the gap having a width; and
   means for shaping the magnetic field strength profile adjacent the gap width with minimal flux constriction.

2. A slider having:
   an air-bearing surface to support flying of the slider a design distance from a magnetic recording media rotating at a design rotational speed; and
   an inductive magnetic head having
      first and second magnetic poles separated by a gap, the first and second poles and gap supported on the slider and having surfaces in the plane of the air-bearing surface, the gap having a gap length extending between the poles, and
      a recess in the air-bearing surface adjacent the gap, the recess having a first portion having a length parallel to the length of the gap and extending across the length of the gap and into at least the first magnetic pole to define a gap width orthogonal to the gap length, the first portion of the recess having a curved depth defining a curved profile along its length.

3. The slider of claim 2, wherein the magnetic head is a write head having a coil for carrying a write current, the first and second poles and coil generating a write magnetic field having a write field strength in the confronting magnetic media greater than a minimum media switching strength, the curved profile of the recess being so disposed and arranged as to shape the magnetic field strength in the magnetic media confronting the recess to a relatively flat profile along the length of the recess that is smaller than the minimum media switching strength.

4. The magnetic head of claim 2, wherein the curved profile of the first portion is a continuous curve along its length and defines a region of greatest depth of the recess adjacent the gap.

5. The magnetic head of claim 4, wherein the curved profile is parabolic.

6. The magnetic head of claim 2, wherein the recess extends into the second magnetic pole.

7. The magnetic head of claim 2, wherein the recess has a second portion extending into the air-bearing surface having a length orthogonal to the gap length, the second portion of the recess defining a curved profile along its length and intersecting the air-bearing surface remote from the gap.

8. The magnetic head of claim 7, wherein the recess is substantially L-shaped and the first and second portions of the recess form separate legs of the substantially L-shaped recess, the leg formed by the second portion having its curved profile along its length and its width.

9. The magnetic head of claim 8, wherein the curved profile of the first portion is a continuous curve along its length intersecting with the air-bearing surface, the curved profiles of the first and second portions define a region of greatest depth of the recess adjacent the gap.

10. The magnetic head of claim 9, wherein the curved profiles are parabolic.

11. The magnetic head of claim 8, wherein the recess extends into the second magnetic pole and the curved portion of the second portion extends into both the first and second magnetic poles.

12. The magnetic head of claim 7, wherein the curved profile of the first portion is a continuous curve along its length intersecting with the air-bearing surface, the curved profiles of the first and second portions define a region of greatest depth of the recess adjacent the gap.

13. The magnetic head of claim 7, wherein the recess extends into the second magnetic pole and the curved portion of the second portion extends into both the first and second magnetic poles.

14. The magnetic head of claim 13, wherein the curved profile of the first portion is a continuous curve along its length intersecting with the air-bearing surface, the curved profiles of the first and second portions define a region of greatest depth of the recess adjacent the gap.

15. A process of manufacturing an inductive magnetic head designed to fly a design distance adjacent a magnetic media rotating at a design velocity, comprising:
   providing a slider having a planar air-bearing surface and first and second magnetic poles separated by a gap, the first and second poles and the gap having surfaces in the plane of the air-bearing surface; and
   etching a first portion of a recess into the air-bearing surface adjacent the gap along a length parallel to the gap length and extending into at least the first magnetic pole to define a gap width orthogonal to the gap length, the etching of the first portion forming a curved depth defining a curved profile along the length of the first portion.

16. The process of claim 15, wherein the slider includes a coil for carrying a write current, the first and second poles and coil generating a write magnetic field having a write field strength in the confronting magnetic media greater than a minimum media switching strength, wherein the etching of the curved profile of the recess shapes the magnetic field strength in the magnetic media confronting the recess to a relatively flat profile along the length of the recess that is smaller than the minimum media switching strength.

17. The process of claim 15, wherein etching the curved profile of the first portion forms a continuous curve inter secting with the air-bearing surface with the greatest depth of the recess adjacent the gap.

18. The process of claim 17, wherein the curved profile is parabolic.

19. The process of claim 15, wherein etching the first portion of the recess extends into the second magnetic pole.

20. The process of claim 15, including etching a second portion of the recess into the air-bearing surface along a length orthogonal to the gap length, the etching of the second portion forming a curved depth defining a curved profile along the length and width of the second portion.

* * * * *